Nov. 3, 1931.    A. H. BATES    1,830,691
HEAT CONTROL FOR CAR HEATERS
Filed Aug. 9, 1929
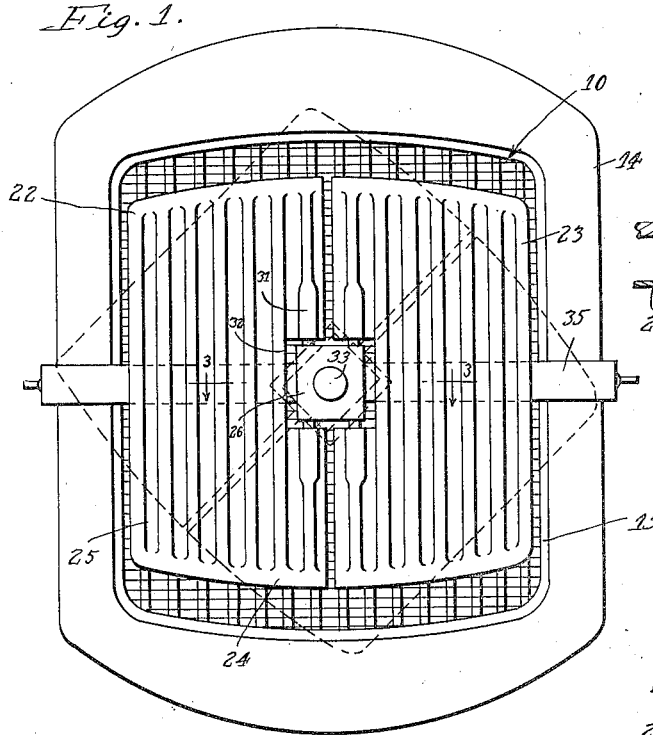
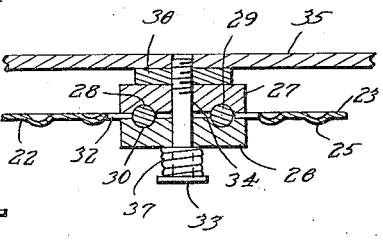
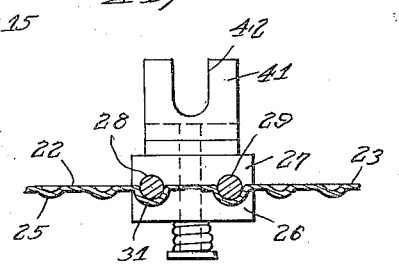
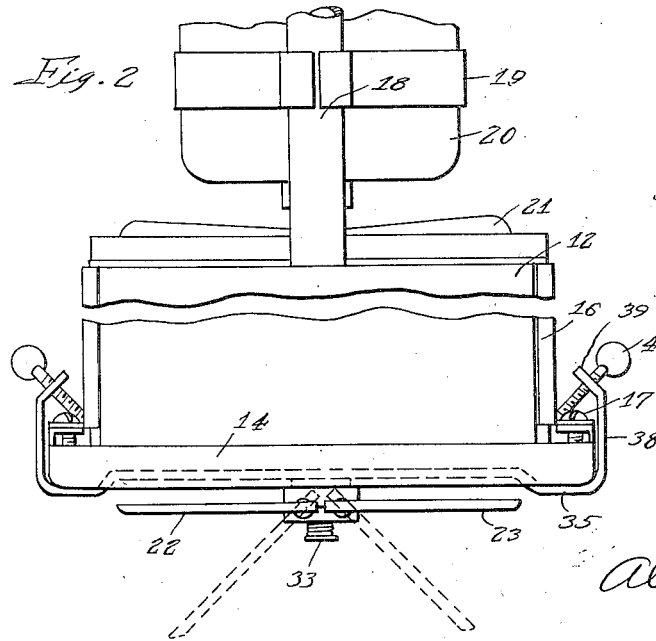
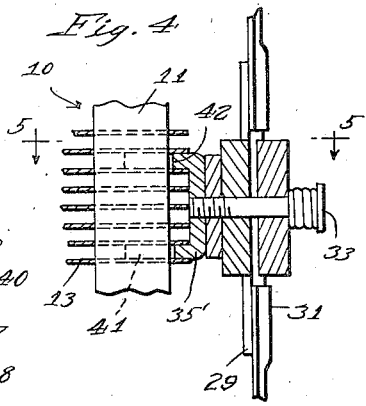
Inventor:
Albert H. Bates
By
Wilson & McCanna
Attys.

Patented Nov. 3, 1931

1,830,691

UNITED STATES PATENT OFFICE

ALBERT H. BATES, OF ROCKFORD, ILLINOIS, ASSIGNOR, BY MESNE ASSIGNMENTS, TO LIBERTY FOUNDRIES COMPANY, OF ROCKFORD, ILLINOIS, A CORPORATION OF ILLINOIS

HEAT CONTROL FOR CAR HEATERS

Application filed August 9, 1929. Serial No. 384,761.

This invention relates to heaters for use on motor vehicles and more particularly that type utilizing the heat in the water of the engine cooling system.

Heaters of the kind referred to have a forced draft of air therethrough secured by means of an electric fan. The matter of controlling the heat with this type of heater has been a problem. Regulating the flow of the water has been tried but has not proven satisfactory generally, because such control is not anywhere near instantaneous, and the driver, after cutting down the flow of the water when the heater is found to be giving too much heat, too often finds later that the heater has been shut off too much, so that repeated adjustments have to be made attended with a great deal of uncertainty as to the satisfactoriness of any given adjustment. Before that method of control was tried and acknowledged to be unsatisfactory, it had been attempted to control the heat delivery by controlling the speed of operation of the fan, usually with a two-speed switch for the motor thereof, but that method was found to be unsatisfactory because the range of adjustment was entirely too small and, in fact, very few people would notice much difference in the heating effect whether the fan were operated at the higher or lower speed. It is, therefore, the principal object of my invention to provide not only for a complete heat control but a control that is instantaneous as well and is, moreover, absolutely positive in its action so as to give just the exact amount of heat desired, and directed toward any part of the car desired.

According to my invention I provide a plurality of baffles adapted to substantially completely cover the heat delivery opening in the front of the heater so as to cut down the draft therethrough to a minimum and correspondingly curtail the heating effect produced, the said baffles being mounted for outward swinging movement to give more and more heating effect according to the extent the baffles are opened out, the baffles in the angular positions serving at the same time to direct the heat to the place desired, and said baffles being, furthermore, mounted to be turned whereby to bring the same to any desired position to direct the heat upwardly, downwardly or laterally.

In the case of heaters installed without this heat control I provide for the mounting of said baffles on a bracket arranged to be clamped in place thereon, so that the same may be sold as an accessory. Otherwise, I contemplate permanently mounting the baffles on the front of the heater for the angular and rotary adjustment described.

The invention is illustrated in the accompanying drawings, wherein—

Figure 1 is a front view of a car heater equipped with my improved heat control, the baffles being shown fully closed;

Fig. 2 is a plan view of Fig. 1 serving to indicate how the bracket, which also appears in Fig. 1, is arranged to be clamped onto the heater;

Fig. 3 is a horizontal sectional detail on a slightly enlarged scale through the baffle mounting;

Fig. 4 is a vertical section showing a modification of the baffle mounting; and

Fig. 5 is a horizontal section on the line 5—5 of Fig. 4.

Corresponding reference numerals are applied to the parts in the various views.

The heater in connection with which I illustrate my invention is of that type disclosed in my application Serial No. 311,032, filed October 8, 1928. The same comprises a radiator core 10 of any suitable or preferred construction but preferably of the turbo-tube type having two or three rows of vertically disposed flat tubes 11 connected at their upper and lower ends with header tanks 12 and provided with transverse radiating fins 13. I mention this special core construction because the features thereof are taken advantage of where the heat control is built onto the heater at the factory instead of being mounted thereon as an accessory. A front plate 14 constitutes an ornamental frame for the front of the radiator and defines the margins of the heat delivery opening 15. The plate 14 has inturned flanges at opposite sides thereof arranged to be bolted to outturned flanges provided on the opposite sides of a sheet metal shroud 16, as indicated at 17. Pipes 18 extend rearwardly from the top and bottom header tanks 12 and have brackets 19 clamped thereon and supporting an electric motor 20 operating an electric fan 21 behind the radiator. The fan provides a forced draft of clean fresh air through the radiator from behind the latter and the air, in passing through the core, is heated and delivered from the heater through the opening 15. So much for a general discussion of the heater itself.

The heat control of the present invention comprises a pair of baffles 22 and 23 preferably stamped from sheet metal with marginal beads 24 and longitudinal ribs 25 to make for ornamental appearance and at the same time lend additional stiffness so that the baffles will not be apt to be bent out of shape in the handling thereof. The baffles are mounted for swinging movement with reference to a pair of plates 26 and 27 on hinge pintles 28 and 29, respectively, which are received in recesses 30 provided in the plates 26 and 27, as shown in Fig. 3. The pintles 28 and 29 are suitably welded at their opposite ends onto the baffles, the latter being struck to provide short channels 31 to accommodate the ends of the pintles and being cut away as indicated at 32 to accommodate the plates 26 and 27 and allow the baffles to be swung with reference to the plates, as indicated in dotted lines in Fig. 2. Now, a bolt 33 is passed through registering holes 34 in the plates 26 and 27 and threaded into a bracket 35, a lock nut 36 being threaded on the bolt between the plate 27 and the bracket 35 and being tightened against the bracket 35 to hold the bolt 33 locked against any possibility of turning when the plates 26 and 27 are turned with reference to the bolt in the turning of the baffles 22 and 23 about the bolt 33 as a center, as indicated in dotted lines in Fig. 1. The bolt 33 has a coiled compression spring 37 under the head thereof bearing against the plate 26 and serving to hold the plates 26 and 27 together with the pintles 28 and 29 clamped therebetween with freedom to turn relative to the plates. The bracket 35 extends crosswise of the front of the heater, as shown, and has the opposite ends thereof bent rearwardly substantially parallel to one another, as shown at 38, with the extremities thereof bent inwardly toward each other, as shown at 39, and having thumb screws 40 threading therein. The screws 40 are arranged to engage the back of the outturned flanges on the shroud 16 and when the screws are tightened to clamp the bracket 35 in place it is evident that the baffles 22 and 23 are very rigidly supported and there is no danger of any parts working loose and rattling.

In operation, when the heater is found to be giving entirely too much heat and still it is not advisable to shut it off, the baffles 22 and 23 may be closed all way, as shown in Fig. 1, thereby cutting down the draft through the radiator 10 to a minimum, only a little air being allowed to pass through the radiator past the upper and lower edges of the baffles and about the side edges. If a little more heat is desired it is only a question of increasing the draft more and more by swinging one or both baffles outwardly, as indicated in dotted lines in Fig. 2. The baffles in that case will serve to deflect the heat according to the position thereof. Thus, when the baffles are in the dotted line position shown in Fig. 2 half of the heat will be thrown to the left and the other half to the right for the comfort of the driver and the passenger. If there is no passenger in the car and the driver wants the benefit of all of the heat, he can secure that by swinging the baffle 22 outwardly to the dotted position and leaving the baffle 23 in the full line position. Furthermore, the baffles may be turned together about the common center afforded by the bolt 33, as indicated in dotted lines in Fig. 1, to throw the heat upwardly or downwardly, or both, and as much to one side or the other as desired. In that way, the heat can be directed to any part of the car desired. Thus, the heat can be directed toward the floor to keep one's feet warm or can be thrown upwardly, as for example, toward the windshield to keep the same from frosting in extremely cold weather. It should be evident from this description of the operation that the invention is not limited to use with hot water heater because the nature of the heating medium is immaterial.

In place of the bracket 35, arranged to be provided where the heat control is sold as an accessory, I may provide a bracket 35' arranged to be permanently secured to the radiator core where the heat control is provided as a part of the heater as it leaves the factory. This bracket is formed of sheet metal to a channel shape, as appears in Fig. 4, the upper and lower flanges 41 of the channel being arranged to fit into the spaces between fins 13 and being notched out, as indicated at 42, to straddle the edge of one of the flat tubes 11 of the radiator core. The bracket 35' may be sweat soldered, or otherwise suitably secured, onto the radiator core. By reason of the fact that the bracket engages and is tied to both the fins and one of the tubes of the core it is easily rigid enough to support the baffles.

It is believed the foregoing description conveys a clear understanding of my invention and of all of its objects and advantages. While reference has been made in the description to certain details of construction it should be understood that changes might be made without departing from the spirit and scope of the invention. For that reason the appended claims should be broadly construed to include all legitimate modifications and adaptations.

I claim:

1. In a heater, the combination of a radiator adapted to be heated, the same having a casing enclosing the same open at the front and rear of said radiator, means to produce a forced draft of air therethrough for the distribution of heat from the radiator, and baffle means mounted on said radiator in the front opening of said casing and arranged to be opened to different positions of angularity to afford the desired amount of draft and accordingly regulate the amount of heat delivered from the radiator, said baffle means being moved in one plane to open and close the same and when partly opened being arranged to deflect the heated air coming in contact therewith and being arranged to be turned in another plane whereby to direct the heated air by deflection toward any particular place to be heated.

2. In a heater, the combination of a radiator adapted to be heated, means for delivering a forced draft of air therethrough for the distribution of heat from the radiator, and a heat control comprising one or more baffles adapted to cover or uncover a desired portion of the area of the front of the radiator, a fixed support for said baffles on the front of the radiator, and means providing a universal joint connection between the baffles and said support permitting outward swinging movement of each of the baffles about one axis for the purpose of more or less uncovering the radiator front, and rotation of the baffles about a transverse axis whereby to direct the heated air by deflection off the baffles toward any place to be heated.

3. In a heater, the combination of a radiator adapted to be heated, means for delivering a forced draft of air therethrough for the distribution of heat from the radiator, and a heat control comprising a pair of complementary baffles, each of which is arranged in closed position to cover at least a portion of one half of the radiator front, a hinge support for said baffles permitting the swinging thereof on a certain axis to different positions of opening to regulate the draft according to the amount of heat desired, and a swivel support on the front of the radiator in relation to which the two baffles are arranged to be turned together about a transverse axis whereby to permit deflection of the heated air by the baffles laterally, upwardly or downwardly.

4. In a heater, the combination of a radiator adapted to be heated, means for delivering a forced draft of air therethrough for the distribution of heat from the radiator, and a heat control on the front of the radiator comprising a fixed supporting bracket, a pivot bolt projecting forwardly therefrom, a baffle supporting means swiveled on said bolt, and a pair of baffles each hingedly mounted on said means in side by side relation to one another to swing with reference to said means on an axis in transverse relation to the swivel axis of said means.

5. A device as set forth in claim 4 wherein the radiator is of a type having spaced paralled tubes extending in one direction and transverse radiating fins having the tubes extending therethrough, and wherein the fixed supporting bracket comprises a channel member disposed with the flanges thereof entered between fins of said radiator and secured thereto, the flanges being notched out for reception of a portion of at least one of the tubes of said radiator, said bracket being also secured to said tube.

6. A device as set forth in claim 4 wherein the radiator is of a type having spaced parallel tubes, and wherein the fixed supporting bracket comprises a channel member having the two flanges thereof notched out to straddle a portion of at least one of the tubes of said radiator, the said bracket being secured thereto.

7. In a heater, the combination of a radiator adapted to be heated, means for delivering a forced draft of air therethrough for the distribution of heat from the radiator, and a heat control on the front of the radiator comprising a fixed supporting bracket, a pivot bolt projecting forwardly therefrom, a pair of plates swiveled on said bolt, a pair of baffles each having a hinge pintle disposed between the plates for swinging movement of the baffle relative thereto, and means for drawing the plates together to clamp said pintles.

8. A device as set forth in claim 7 wherein the last mentioned means comprises a compression spring on said pivot bolt serving to urge the plates together so as to clamp the pintles yieldingly and thus permit easy swinging movement of said baffles.

9. In a heater, comprising a heating unit, and means for supplying air to be heated by the unit and delivered therefrom, the combination of a heat control baffle, a support therefor supporting the same in front of the heating unit in the draft of heated air, said support being so constructed that the baffle may be moved bodily to different operative positions, and means for pivotally mounting the baffle on said support so that in any operative position of the baffle the same may be swung to a position of the desired angularity relative to the front of the heating unit for the purposes described.

10. In a heater, the combination of a heating unit, means for supplying air to be heated by the unit and delivered therefrom, a plurality of baffles disposed in front of the heating unit in the draft of heated air, a rotary support for said baffles whereby the same are arranged to be turned simultaneously to any desired operative position, and a separate hinge support for each of said baffles whereby each is arranged to be swung individually to a desired angularity.

11. A device as set forth in claim 8, wherein the radiator is of a type having spaced parallel tubes, and wherein the fixed supporting bracket comprises a channel member having the two flanges thereof engaging on opposite sides of at least one of the tubes and suitably secured thereto, the portion of the channel between the flanges having the pivot bolt carried thereby.

12. In a heater, the combination of a heating unit, means for supplying air to be heated by the unit and delivered therefrom, a plurality of baffles disposed in front of the heating unit in the draft of heated air, a rotary support for said baffles whereby the same are arranged to be turned simultaneously in one plane to any desired operative position, and a separate pivotal mounting for each of said baffles on said rotary support permitting the swinging thereof relative to the support in another plane.

13. In a heater, the combination of a radiator adapted to be heated, means for delivering a forced draft of air therethrough for the distribution of heat from the radiator, and a heat control on the front of the radiator comprising a fixed supporting bracket, a pivot bolt projecting forwardly therefrom, baffle supporting means swiveled on said bolt, and a pair of baffles each hingedly mounted on said means in side by side relation to one another to swing with reference to said means on an axis in transverse relation to the swivel axis of said means, said radiator being of a type having spaced parallel tubes extending in one direction and transverse radiating fins having the tubes extending therethrough and the fixed supporting bracket comprising a channel member disposed with the flanges thereof entered between fins of said radiator and secured thereto.

14. In combination, a heating element having an open face, a heat deflector for said heating element consisting of a plurality of deflector plates situated adjacent said open face, an axis supporting said plates for rotative movement as a unit in a plane approximately parallel to said open face, and an axis supporting said plates for independent movement toward and away from said open face, each of said deflector plates being adapted to remain, against the probability of accidental displacement, at any adjusted position to which set upon either of said axes.

15. In combination, a heating element having an open face, a stud supported upon said heating element adjacent said open face, a member rotatably mounted upon said stud, a deflector plate, and means supporting said deflector plate upon said member for swinging movement toward and from said open face, said deflector plate being adapted to remain, against the probability of accidental displacement, at any adjusted position to which set.

16. In a heater, the combination with a heating means, and means for supplying air to be heated thereby and delivered therefrom, of a heat control baffle disposed in the draft of heated air, a pivoted baffle support, and means for pivotally mounting the baffle on said support so that the baffle may be swung in one plane to a position of the desired angularity for deflection of the heated air coming in contact therewith, said baffle support being arranged to be turned on its pivot for movement of the baffle in another plane for deflection of the heated air in a desired direction.

17. In a heater, the combination with a heating means, and means for supplying air to be heated thereby and delivered therefrom, of a plurality of heat control baffles, a pivoted baffle support, and means for individually pivotally mounting the baffles on said support so that they may be swung independently of one another to positions of the desired angularity for deflection of the heated air coming in contact therewith, said baffle support being arranged to be turned on its pivot to bring the baffles into a position for deflection of the heated air in a predetermined desired direction.

18. In combination, a heat exchange unit, means for supplying air to be heated thereby and delivered therefrom, a plurality of heat control baffles disposed in the draft of heated air, and means for mounting said baffles for universal pivotal adjustment relative to the unit whereby to permit swinging of each baffle in one plane to the desired angle and turning of the baffles in another plane to the desired position, said means comprising a baffle support arranged to turn relative to the unit for bodily adjustment of all of the baffles in the latter plane, and separate pivots for the baffles on said support arranged to permit individual swinging movement thereof in the former plane.

19. In a heater, the combination of a fixed support, a heater carried thereon, means for supplying air to said heater to be heated thereby and delivered therefrom, and means for deflecting the heated air as desired, comprising a baffle disposed in the draft of heated air for deflection thereof in a certain plane, and a supporting element for mounting the baffle on the front of the heater element, one of the last two mentioned elements, namely said baffle supporting element and said heater element, being mounted for pivotal movement relative to the fixed support whereby to adjust the baffle in another plane transverse to the first mentioned plane so as to throw the heated air by deflection in the desired direction relative to the fixed support.

20. In a heater, the combination of a fixed support, a heater element carried thereon, means for supplying air to said heater element to be heated thereby and delivered therefrom, and means for regulating the flow of the heated air and deflecting the same in the desired direction, comprising a baffle disposed in the draft of heated air, said baffle being arranged to be opened and closed to regulate the flow and when partly opened being arranged to deflect the heated air in a certain plane, and a supporting element for mounting the baffle on the front of the heater element, one of the two last mentioned elements, namely said baffle supporting element and said heater element, being mounted for pivotal movement relative to the fixed support whereby to adjust the baffle in another plane for deflection of the heated air in the desired direction relative to the fixed support, said baffle being pivoted on said supporting element for movement to open and closed positions.

21. In a heater, the combination of a fixed supporting element, a heater element carried thereby; means for supplying air to the latter to be heated and delivered therefrom, and means for deflecting the heated air as desired, comprising a baffle disposed in front of the heater element in the draft of heated air for deflection thereof in one plane, and a support therefor mounted on one of the first two mentioned elements for pivotal movement whereby to adjust the baffle in another plane transverse to the first mentioned plane so as to throw the heated air by deflection in the desired direction relative to the fixed supporting element.

22. In a heater, the combination of a fixed supporting element, a heater element carried thereby, means for supplying air to the latter to be heated and delivered therefrom, and means for regulating the flow of the heated air and deflecting the same in the desired direction, comprising a baffle disposed in front of the heater element in the draft of heated air, said baffle being arranged to be opened and closed to regulate the flow and when partly opened being arranged to deflect the heated air in a certain plane, and a support therefor mounted on one of the first two mentioned elements for pivotal movement whereby to adjust the baffle in another plane so as to throw the heated air by deflection in the desired direction relative to the fixed supporting element, said baffle being pivoted on said support for movement to open and closed positions.

23. In a heater, the combination of a heating means, the same having a casing open at the front and rear for outlet and inlet of air, means for delivering air for passage through the casing to distribute heat from the heating means, and baffle means in the front opening of said casing, the same being constructed of such dimensions to substantially completely shut off the flow of air through the casing when the same is closed, the same serving when opened to different positions of angularity to afford different drafts and accordingly regulate the heat distribution, said baffle means being mounted for swinging movement in one plane to bring the same to the desired angularity whereby to control the draft as desired, the same serving when in angular positions to deflect the air coming in contact therewith, and said baffle means being further mounted for turning in another plane to throw the heated air by deflection in the desired direction.

24. In combination, a heat exchange unit, means for supplying air to be heated thereby and delivered therefrom, a substantially flat blade-like heat control member disposed in forwardly spaced relation to the front of the unit and, in one position of adjustment, substantially parallel with the front of said unit so as to be struck by the heated air issuing from said unit, whereby said member serves to retard the flow of air and the distribution thereof from the unit, and means for mounting said member for universal pivotal adjustment relative to the unit, whereby to permit swinging of the member in one plane to a desired angle to secure the deflection of the heated air outwardly relative to the unit, and turning thereof in another plane to a desired position to determine the direction of such deflection.

25. In a heater, the combination with a heating means, and means for supplying air to be heated thereby and delivered therefrom, of a heat control baffle disposed in the draft of heated air, a baffle support movable on the heater from one operative position to another, and means for pivotally mounting the baffle on said support so that the baffle may be swung to a position of the desired angularity for deflection of the heated air coming in contact therewith, said baffle support being arranged to be moved to adjust the baffle to a desired position on the heater.

26. In a heater, the combination with a heating means, and means for supplying air to be heated thereby and delivered therefrom, of a plurality of heat control baffles, a baffle support movable on the heater from one operative position to another, and means for individually pivotally mounting the baffles on said support so that they may be swung to positions of the desired angularity for deflection of the heated air coming in contact therewith, said baffle support being arranged to be moved to adjust all of the baffles simultaneously to a desired position on the heater.

In witness of the foregoing I affix my signature.

ALBERT H. BATES.